(No Model.)

M. B. MANWARING.
BOTTLE STOPPER.

No. 301,139. Patented July 1, 1884.

WITNESSES:
H. Edmonds.
D. E. Somes.

INVENTOR:
Morris B. Manwaring
BY F. E. Somes
ATTORNEY.

UNITED STATES PATENT OFFICE.

MORRIS B. MANWARING, OF CHICAGO, ILLINOIS.

BOTTLE-STOPPER.

SPECIFICATION forming part of Letters Patent No. 301,139, dated July 1, 1884.

Application filed October 31, 1883. (No model.)

*To all whom it may concern:*

Be it known that I, MORRIS B. MANWARING, a citizen of the United States of America, residing at Chicago, in the county of Cook and State of Illinois, have invented certain new and useful Improvements in Bottle-Stoppers, of which the following is a specification, reference being had therein to the accompanying drawings.

This invention relates to bottle-stoppers composed of an inner core of cork and an outer casing of rubber.

The object of the invention is to provide an elastic insulated cork stopper which can be produced economically, applied in the ordinary manner, and withdrawn by an ordinary cork-screw.

Figure 1:
Figure 2:
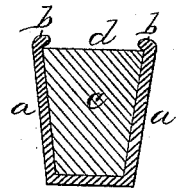
Figure 3:
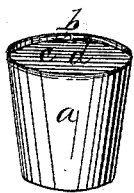
Figure 4:

Figure 1 is an elevation of an ordinary cork stopper, which forms the core of this improved bottle-stopper. Fig. 2 is a section of this improved bottle-stopper composed of the cork core and rubber casing. Fig. 3 is a perspective view of the compound stopper. Fig. 4 shows the invention as applied to bungs.

The stopper is composed of the common cork stopper A and the elastic casing B. The casing B has a plain-sided interior, whereby it is adapted to fit the ordinary cork and is closed at its lower end, so that the cork is thoroughly insulated from the action of the contents of the bottle. At its upper end the casing is provided with an inwardly-projecting flange, *a*, which yields to admit the cork and shuts over the upper edge thereof, holding the cork within the casing, and leaves the center exposed for the action of the cork-screw. This casing is made of vulcanized soft rubber or other suitable material impervious to water. A similar casing may also be used for bungs.

What is claimed as the invention is—

A bottle-stopper consisting of an ordinary bottle-cork having its bottom and circumference entirely covered with a vulcanized-rubber casing, the top of which is provided with an inwardly-projecting flange which laps over the upper edge of the cork, for holding the cork within the casing, and leaves the center of the cork exposed for the action of the cork-screw, the stopper being tapered throughout its length, whereby it may be inserted flush with the neck of the bottle, substantially as described.

In testimony whereof I affix my signature in presence of two witnesses.

MORRIS B. MANWARING.

Witnesses:
S. C. KNIGHT,
OTTO PELTZER.